US005631698A

United States Patent [19]
Lee

[11] Patent Number: 5,631,698
[45] Date of Patent: May 20, 1997

[54] METHOD FOR SELF-DIAGNOSING A TELEVISION RECEIVER

[75] Inventor: Jang-Hwan Lee, Seoul, Rep. of Korea

[73] Assignee: Daewoo Electronics Co., Ltd., Seoul, Rep. of Korea

[21] Appl. No.: 558,134

[22] Filed: Nov. 13, 1995

[30] Foreign Application Priority Data

Nov. 11, 1994 [KR] Rep. of Korea ............... 94-29533
Nov. 11, 1994 [KR] Rep. of Korea ............... 94-29539

[51] Int. Cl.$^6$ ................................................. H04N 17/00
[52] U.S. Cl. ................. 348/178; 348/730; 395/183.12; 395/183.18; 395/183.19; 365/210
[58] Field of Search .................... 348/730, 177, 348/178, 180, 718, 719; 340/514, 516; 395/183.08, 183.12, 183.18, 183.19; 365/210; 371/20.1; H04N 17/00, 17/04

[56] References Cited

U.S. PATENT DOCUMENTS

| | | | |
|---|---|---|---|
| 4,672,534 | 6/1987 | Kamiya | 395/183.08 |
| 4,706,108 | 11/1987 | Kumagai et al. | 348/178 |
| 5,193,177 | 3/1993 | Burri | 395/183.19 |
| 5,247,659 | 9/1993 | Curran et al. | 395/183.12 |
| 5,491,794 | 2/1996 | Wu | 348/177 |
| 5,539,702 | 7/1996 | Ahn | 365/210 |

Primary Examiner—Michael Lee
Assistant Examiner—Jeffrey S. Murrell
Attorney, Agent, or Firm—Anderson Kill & Olick P.C.

[57] ABSTRACT

A method for self-diagnosing a television(TV) receiver, wherein the TV receiver has a controller, which includes a central processing unit, a read only memory, a random access memory(RAM) and an erasable-programmable read-only memory (EPROM), for controlling the self-diagnosing and a power supply unit for producing both an initial power for driving the controller and an operational power for driving other units of the TV receiver except for the controller, comprises the steps of: (a) determining whether the initial power is applied; (b) first self-diagnosing the TV receiver, if the initial power is supplied, so as to determine either to wait a turn-on signal to turn the TV receiver on or to produce an alarm signal warning an abnormal state; (c) determining whether the turn-on signal is received; and (d) second self-diagnosing the TV receiver while the operational power is activated by the received turn-on signal, to produce a result of the second self-diagnosis onto a screen of the TV receiver.

5 Claims, 5 Drawing Sheets

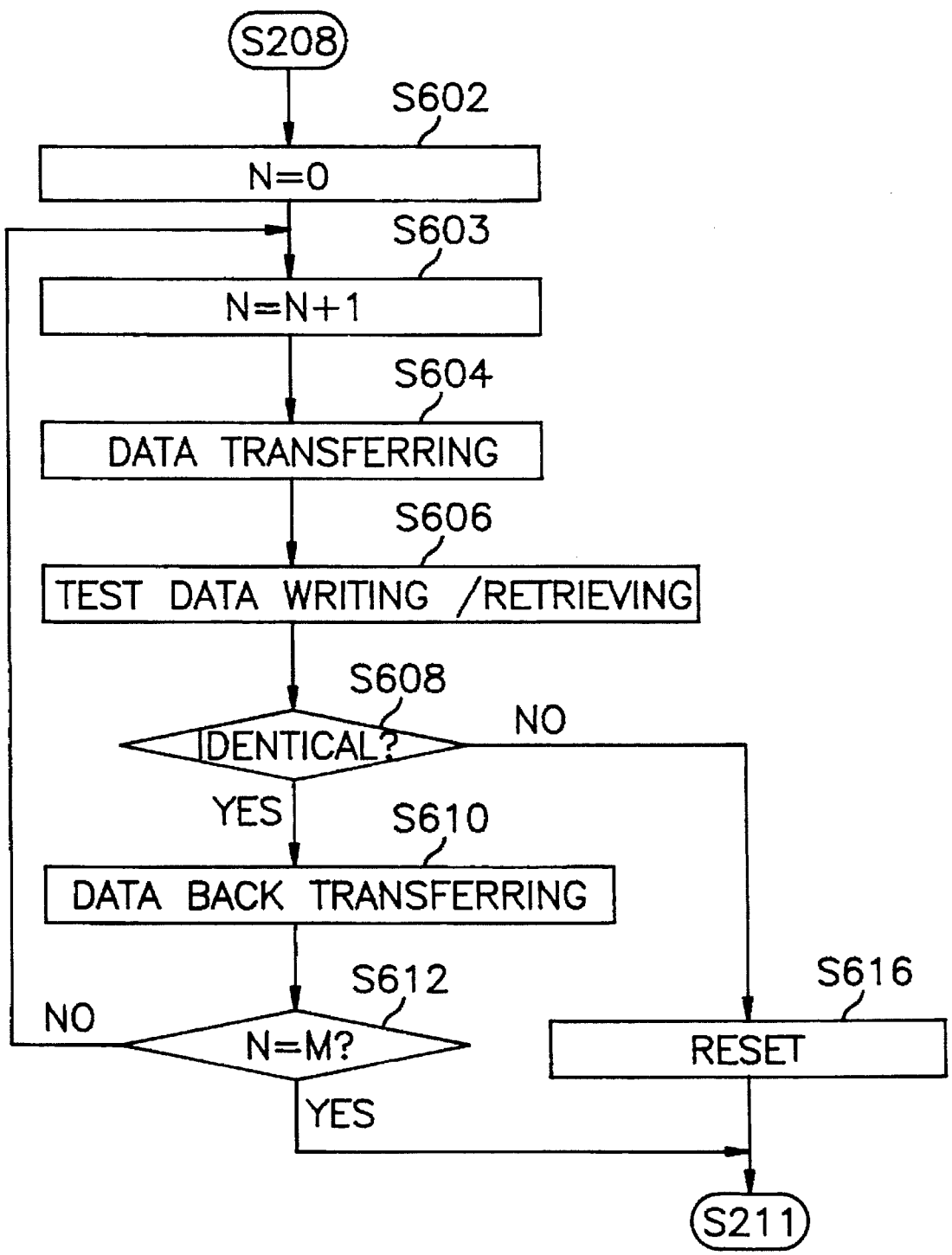

METHOD FOR SELF-DIAGNOSING A TELEVISION RECEIVER

FIELD OF THE INVENTION

The present invention relates to a method for self-diagnosing a television(TV) receiver.

DESCRIPTION OF THE PRIOR ART

Generally, a TV receiver includes a controller for controlling the operation thereof and a power supply unit for providing a DC voltage required for an operation of the TV receiver. There are two types of voltages: one is an initial power to drive the controller and the other is an operational power to operate other units in the TV receiver except for the controller therein. Typically, the controller has a ROM (Read-Only Memory) for storing various system programs, a RAM(Random Access Memory) for storing such operational data as selected channel, volume level and picture adjustment data, e.g., brightness and color levels, during the TV turn-on state, a nonvolatile storage device, e.g., EPROM (Erasable-Programmable Read-Only Memory) for storing such operation data during the power-off state, and a CPU (Central Processing Unit) for executing the system programs.

In a conventional TV receiver, the power supply unit rectifies its AC input to provide the controller with the initial power. If the initial power is applied to the controller and a TV turn-on signal is received, the controller activates the operational power. However, it takes several to several tens of milliseconds to fully activate the operational power. Therefore, the controller has to wait during the activation time so as to execute the various system programs according to the operation data stored in the RAM.

Since, however, if any one of the storage devices, e.g., RAM and EPROM, malfunctions in the controller, the TV receiver delivers an undesired result to a viewer after the operational power is fully activated.

SUMMARY OF THE INVENTION

It is, therefore, a primary object of the present invention to provide a method for self-diagnosing the TV receiver prior to the full activation of the operational power to thereby inform the viewer of the abnormal state, if detected, before an image is displayed on the TV receiver.

In accordance with the present invention, there is presented a method for self-diagnosing a TV receiver, wherein the TV receiver has a controller, which includes a CPU, a RAM, a ROM and an EPROM for controlling the self-diagnosis in accordance with the present invention, and a power supply for producing both an initial power for driving the controller and an operational power for driving other units in the TV receiver except for the controller, which comprises the steps of: (a) determining whether the initial power is applied; (b) first self-diagnosing the TV receiver, if the initial power is supplied, so as to determine either to wait for a turn-on signal to turn the TV receiver on or to produce an alarm signal warning an abnormal state; (c) determining whether the turn-on signal is received; and (d) second self-diagnosing the TV receiver while the operational power is activated by the received turn-on signal to produce a result of the second self-diagnosis onto a screen of the TV receiver.

BRIEF DESCRIPTION OF THE DRAWINGS

The above and other objects and features of the present invention will become apparent from the following description of preferred embodiments given in conjunction with the accompanying drawings, in which:

FIG. 5 depicts a flow chart illustrating a detailed procedure for a second self-diagnosis step in FIG. 2.

DETAILED DESCRIPTION OF THE PREFERRED EMBODIMENTS

Figure 1:
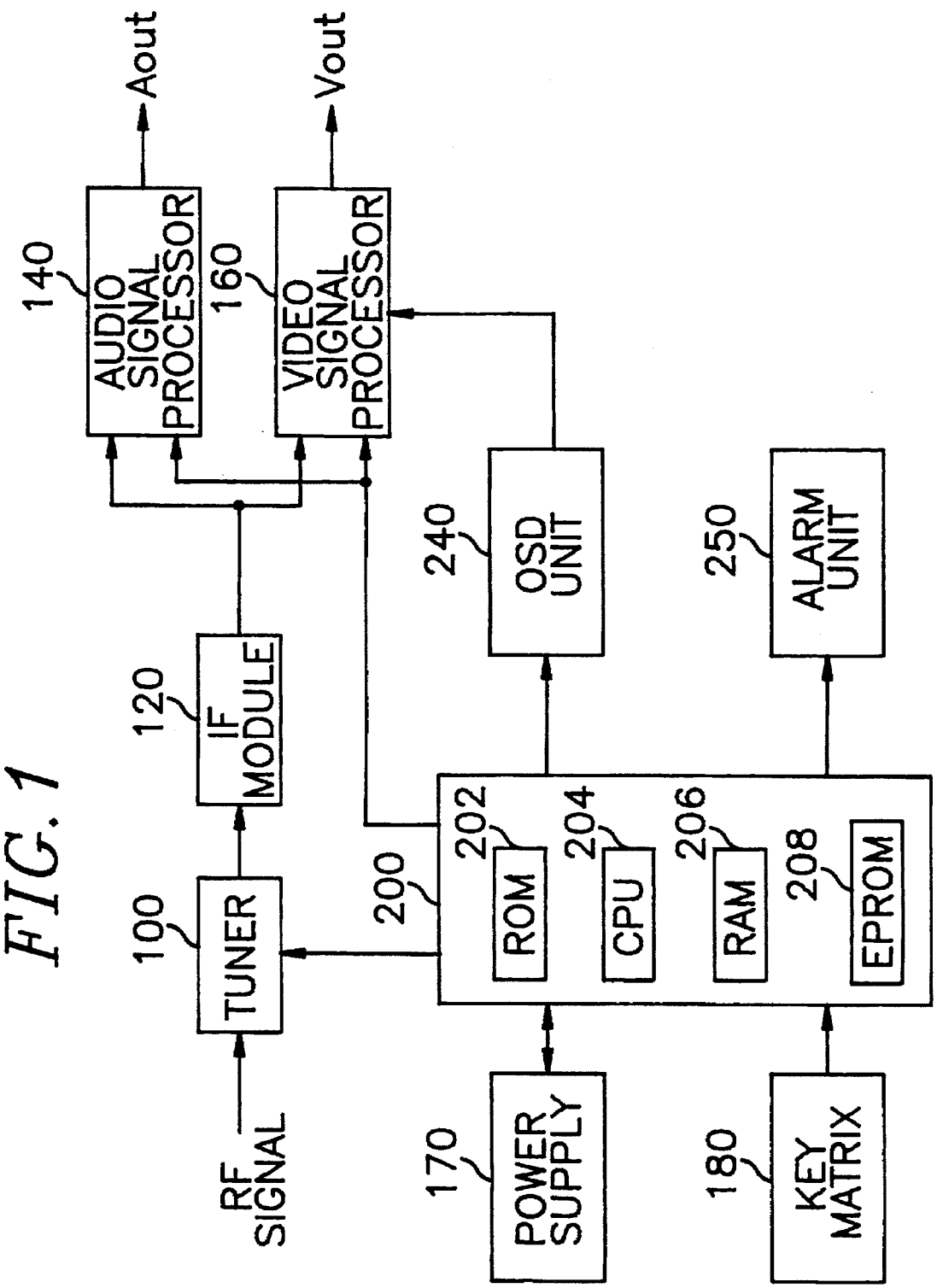
FIG. 1 represents a block diagram of a TV receiver capable of performing a self-diagnosis in accordance with the present invention.

Referring to FIG. 1, there is shown a schematic block diagram of a TV receiver capable of performing a self-diagnosis in accordance with the present invention. The TV receiver includes a tuner 100, an IF(Intermediate Frequency) module 120, an audio signal processor 140, a video signal processor 160, a power supply 170, a key matrix 180, a controller 200, an OSD(On-Screen Display) unit 240 and an alarm unit 250.

As shown in FIG. 1, radio frequency(RF) channel signals from either an antenna or a cable feed(not shown) are inputted to the turner 100. The tuner 100 serves to select a RF channel signal in response to a channel selection signal from the controller 200. The selected RF channel signal is supplied to the IF module 120, wherein the selected RF channel signal is converted to a baseband video and audio signals which are provided to the video signal processor 160 and the audio signal processor 140, respectively. Both the audio signal processor 140 and the video signal processor 160 are controlled by the controller 200 to process the baseband audio and the video signals.

The power supply 170 is coupled to the controller 200 to produce two types of voltages: one is an initial power to drive the controller 200 and the alarm unit 250; and the other is an operational power to drive other units in the TV receiver except for the controller 200 and the alarm unit 250.

The key matrix 180 or a remote controller (not shown) is coupled to the controller 200 and equipped with a number of keys thereon. The key matrix 180 or the remote controller are employed by a user to perform a number of control functions, for example, a channel selection, a turn on/off time reservation, a sound mode(stereo/mono mode) selection and so on.

The OSD unit 240 is employed to display OSD information by using characters or patterns indicative of an abnormal state of the TV receiver, current channel number, current time and the like at a predetermined position, e.g., near upper or lower edge, on a screen. The OSD unit, which may be implemented with a customized integrated circuit, serves to provide the video signal processor 160 with an OSD signal representing the OSD information to be displayed on the screen.

The alarm unit 250 is either a light emitting element such as a LED(Light-Emitting Diode) or a sound producing element notifying the user with the abnormal state detected by a first self-diagnosis described below.

The controller 200 is provided with ROM 202 for storing various system programs, RAM 206 for storing the operational data, e.g., channel number and volume level, which may be changed or updated, and CPU 204 for executing the system programs including a self-diagnosis program. Also the controller 200 is provided with EPROM 208 for storing the operational data during power-off state.

Figure 2:
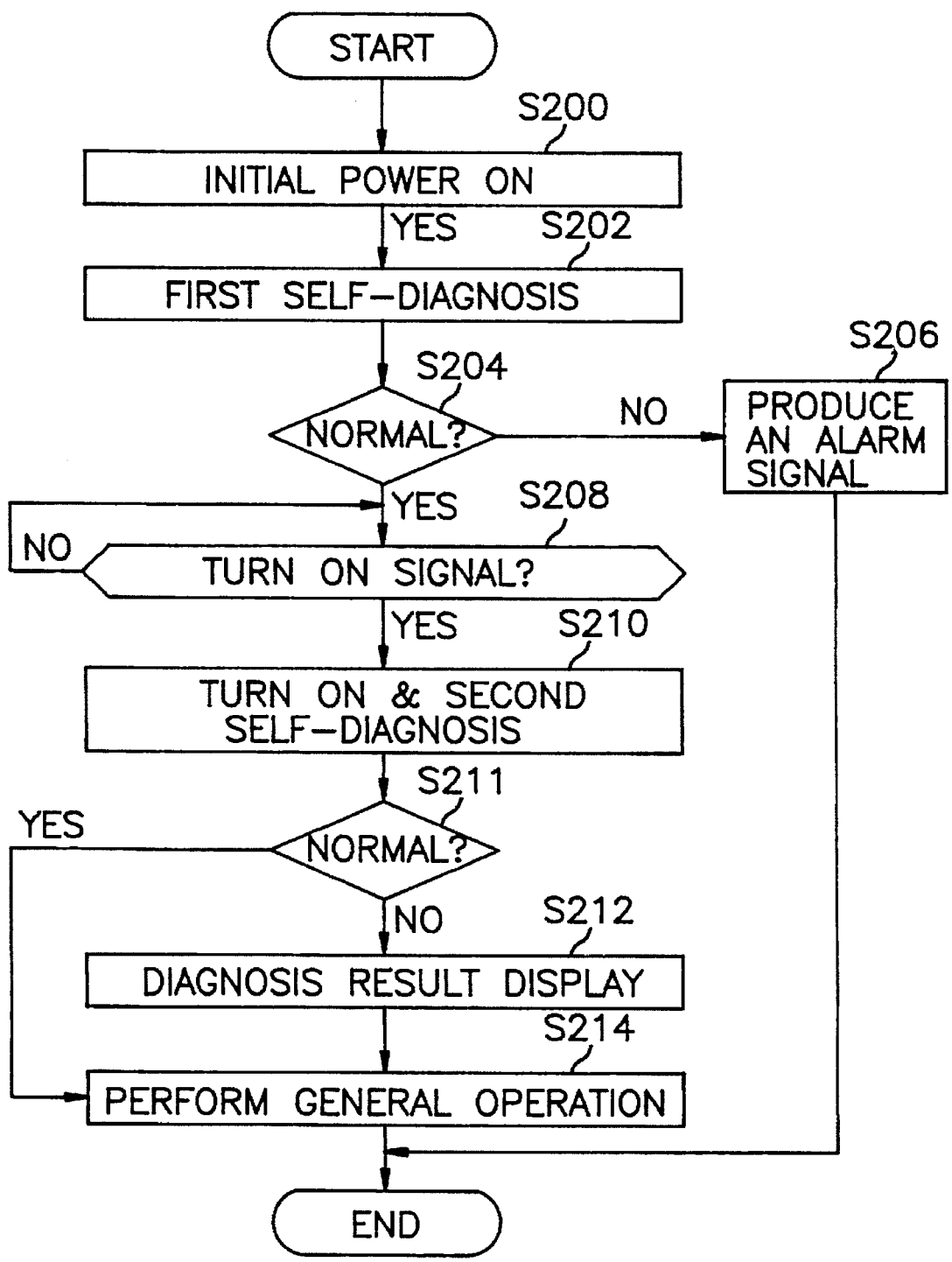
FIG. 2 shows a flow chart illustrating a procedure for self-diagnosing the TV receiver.

Referring to FIG. 2, there is shown a flow chart for illustrating a procedure for self-diagnosing the TV receiver in accordance with the preferred embodiment of the present invention.

In step S200, initial power from the power supply 170 is applied to the controller 200 from a power-off state. Thereafter, in step 202, the controller 200 performs e first self-diagnosis, including tests of RAM 206, EPROM 208 and input/output ports(not shown) of the controller 200.

Figure 3:
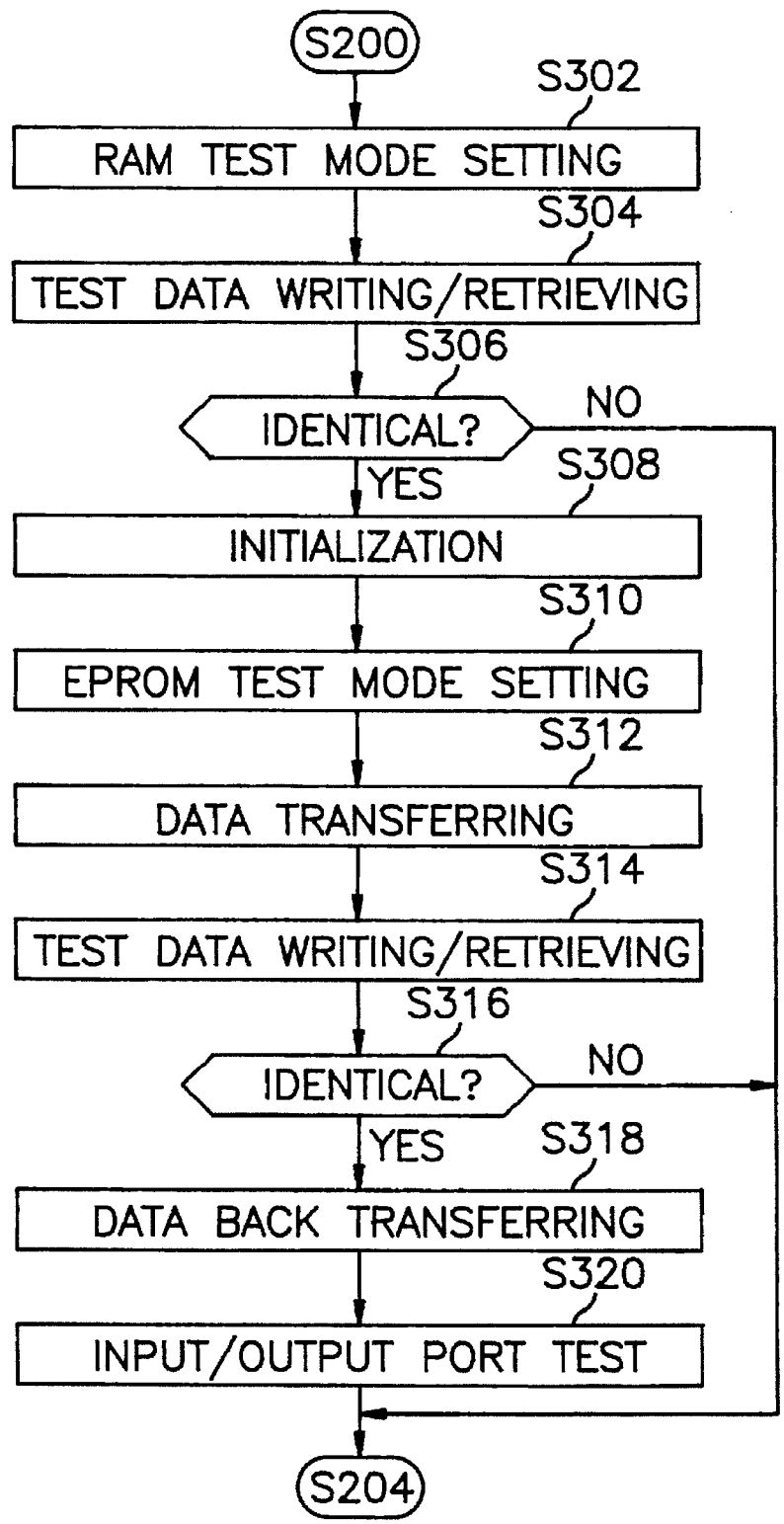
FIG. 3 provides a flow chart illustrating a detailed procedure for a first self-diagnosis step in FIG. 2.

Referring to FIG. 3, there is provided details of the first self-diagnosis step S202 shown in FIG. 2. As shown in FIG. 3, the first self-diagnosis begins with the test of RAM 206. In step S302, there is set a RAM test mode. First, first RAM test data is written onto arbitrary addresses of RAM 206, and then, the stored first RAM test data is retrieved back from RAM 206 in step S304. Subsequently, in step S306, the first RAM test data is compared with the retrieved first RAM test data to determine whether the two coincide with each other. If they are not identical, RAM 206 is not in a normal state and the process proceeds to step S204 shown in FIG. 2; and if the two are identical, in step S308, RAM 206 initialized by removing any data stored therein previously, so that an unexpected abnormal operation of the controller 200 is prevented before it happens.

Thereafter, a test of ROM 202 is set in step S310. In step S312, data stored in arbitrary addresses of EPROM 208 are transferred to RAM 206. And then, in step S314, EPROM test data are written onto the arbitrary addresses of EPROM 208 and the stored EPROM test data are retrieved back from the EPROM 208. In step S316, the original EPROM test data are compared with the retrieved EPROM test data to check whether they are identical or not. If they do not coincide with each other, EPROM 208 is abnormal and the process proceeds to step S204 in FIG. 2. If they are identical, the data are transferred from EPROM 208 to RAM 206 in step S318.

Figure 4:
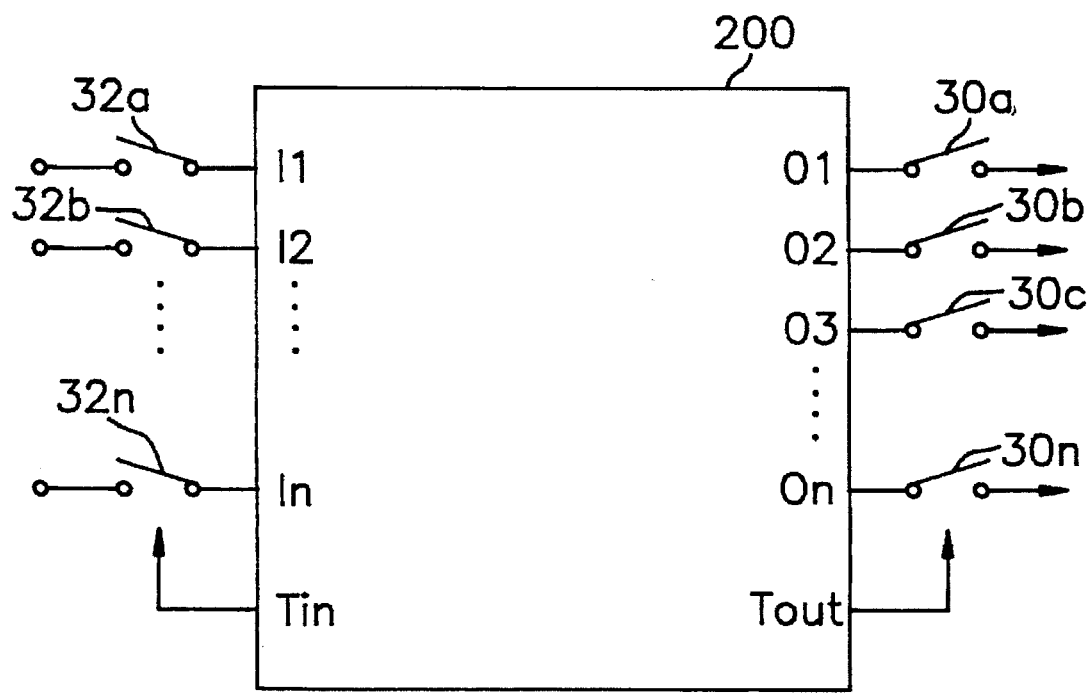
FIG. 4 shows a schematic diagram of a controller shown in FIG. 1.

The final test of the first self-diagnosis is a test of input/output ports of the controller 200 so as to check whether all the input/output ports are normal. Referring FIG. 4, there is schematically shown the controller 200. As shown in FIG. 4, there are four types of ports: a plurality of input ports(I1, I2, . . . , In), a corresponding number of output ports(O1, O2, . . . , On), an input port test port $T_{in}$ and an output port test port $T_{out}$. Input switches (32a, 32b, . . . , 32n) are provided at the front end of the input ports and output switches (30a, 30b, . . . , 30n) are equipped at the front end of the output ports. The test of the input/output ports are performed by applying a predetermined voltage level from the port $T_{in}$ to each of the input ports (I1, I2, . . . , In) and a preset voltage level from the port $T_{out}$ to each of the output ports(O1, O2, . . . , On) through the switches 32a to 32n and to 30n, respectively. Even if any one of the input and output ports receives a voltage level different from the one applied thereto, the input and output ports are determined as being in an abnormal state and the process goes to step S204, Referring back to FIG. 2, in step S204, it is determined whether the first self-diagnosis result is normal or abnormal. If it is abnormal, the process proceeds to step S206. The self-diagnosis process terminates after the controller 200 produce, in step S206, an alarm signal by which the alarm unit 250 shown in FIG. 1 is activated in order to notify the abnormal state to the user.

If the first self-diagnosis result turns out to be normal, the process proceeds to step S208 to determine whether a turn-on signal is provided from the key matrix 180. If the turn-on signal is not received, the procedure goes back to step S208; and if the turn-on signal is received, the controller 200 outputs a control signal to the power supply 170 in order to activate the operational power and performs a second self-diagnosis during the operational power is fully activated at the power supply 170.

Referring to FIG. 5, there is illustrated a detailed flow chart for describing a procedure for the second self-diagnosis step S210 shown in FIG. 2.

The second self-diagnosis tests RAM 206 M times to determine whether the RAM 206 is in its normal state. In step S602, N representing the test number, is set to 0. In step S603, N is increased by 1. And, in Step S604, any data stored in arbitrary addresses so as to be tested in RAM 206 is transferred to an empty storage area of RAM 206. Thereafter, second RAM test data is written onto the arbitrary address of the RAM 206; and the stored second RAM test data is retrieved back from the RAM 206 in step S606. Subsequently, in step S608, the original second RAM test data is compared with the retrieved second RAM test data to determine whether those are identical or not. If they are not identical, the process proceeds to steps S614. In step S616, RAM 206 is reset by removing all the data therein and the process goes to step S211. If they are identical, in the step S610, the data transferred in step S604 are transferred back to the arbitrary addresses in RAM 206. Subsequently in step S612, it is checked whether N is equal to M. If N is not equal to M, in other words, if N is smaller than N, the process goes back to steps 603 and the process described above is repeated until N becomes equal to M. If N is equal to M, the process goes to step S211 shown in FIG. 2.

Referring back to FIG. 2, in step S211, it is checked whether RAM 206 is normal, that is, it is checked whether the RAM tests have been successfully performed M times in step S210 without resetting RAM 206. If it is normal, the process goes to S214. If not, the process proceeds to step S212 wherein the controller 200 shown in FIG. 1 waits until the operational power from the power supply 170 is fully activated and generates thereafter an OSD control signal to the OSD unit 240 in order to display a diagnosis result on the screen. After displaying the diagnosis result on the screen, the process goes to step S214, wherein general operation of the TV receiver is performed.

While the present invention has been shown and described in connection with the preferred embodiments only, it will be readily apparent to those of ordinary skill in the art that many changes and modifications may be made without departing from the spirit and scope of the invention as defined in the appended claims.

What is claimed:

1. A method for self-diagnosing a television(TV) receiver, wherein the TV receiver has a controller, which includes a central processing unit, a read only memory, a random access memory(RAM) and an erasable-programmable read-only memory (EPROM), for controlling the self-diagnosing, and a power supply unit for producing both an initial power for driving the controller and an operational power for driving other units of the TV receiver except for the controller, which comprises the steps of:
   (a) determining whether the initial power is applied;
   (b) first self-diagnosing the TV receiver, if the initial power is supplied, so as to determine either to wait for a turn-on signal to turn the TV receiver on or to produce an alarm signal warning an abnormal state;
   (c) determining whether the turn-on signal is received; and (d) second self-diagnosing the TV receiver while the operational power is activated by the received turn-on signal, to produce a result of the second self-diagnosis onto a screen of the TV receiver.

2. The method according to claim 1, wherein the step (b) for first self-diagnosing the TV receiver includes the steps of:

(b1) writing a first RAM test data onto arbitrary addresses of the RAM;

(b2) retrieving the first RAM test data from the RAM;

(b3) comparing the original first RAM test data with the retrieved first RAM test data to determine a coincidence therebetween; and (b4) initializing the RAM if the two comparing data of the step (b3) coincide, and, otherwise, producing a first abnormal signal so as to generate the alarm signal.

3. The method according to claim 2, wherein the step (b) for first self-diagnosing the TV receiver further includes the steps of:

(b5) transferring data stored in arbitrary addresses of the EPROM to the RAM;

(b6) writing an EPROM test data onto the arbitrary addresses of the EPROM;

(b7) retrieving the EPROM test data from the EPROM;

(b8) comparing the original EPROM test data with the retrieved EPROM test data to determine a coincidence therebetween; and (b9) transferring the data of the step (b5) back to the arbitrary addresses of the EPROM if the two comparing data of the step (b8) coincide, and, otherwise, producing a second abnormal signal so as to generate the alarm signal.

4. The method according to claim 3, wherein the step (b) for first self-diagnosing the TV receiver further includes the step of testing input/output port of the controller.

5. The method according to claim 4, wherein the step (d) for second self-diagnosing the TV receiver includes the steps of:

(d1) transferring data stored in arbitrary addresses of the RAM to other addresses of the RAM;

(d2) writing a second RAM test data onto the arbitrary addresses of the RAM of the step (d1);

(d3) retrieving the second RAM test data from the RAM;

(d4) comparing the second RAM test data of the step (d2) with the retrieved second RAM test data at the step (d3) to determine a coincidence therebetween; and (d5) transferring the transferred words of the step (d1) back to the arbitrary addresses of the RAM of step (d1) if the two comparing data of the step (d4) coincide, and, otherwise, producing the result of the second self-diagnosis.

* * * * *